(12) United States Patent
Costello et al.

(10) Patent No.: US 9,530,243 B1
(45) Date of Patent: Dec. 27, 2016

(54) GENERATING VIRTUAL SHADOWS FOR DISPLAYABLE ELEMENTS

(71) Applicant: Amazon Technologies, Inc., Reno, NV (US)

(72) Inventors: Kevin Robert Costello, Seattle, WA (US); Christopher Wayne Lockhart, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 519 days.

(21) Appl. No.: 14/035,897

(22) Filed: Sep. 24, 2013

(51) Int. Cl.
*G06T 15/00* (2011.01)
*G06T 15/60* (2006.01)

(52) U.S. Cl.
CPC .................................... *G06T 15/60* (2013.01)

(58) Field of Classification Search
CPC .......... G06T 11/60; G06T 15/20; G06T 15/60; G06F 3/048; G06F 3/0481; G06F 17/30994; G09G 5/14
USPC .......................... 345/426, 422, 419, 619, 629
See application file for complete search history.

(56) References Cited

U.S. PATENT DOCUMENTS

| | | | |
|---|---|---|---|
| 6,701,306 B1 | 3/2004 | Kronmiller et al. | |
| 6,985,145 B2 | 1/2006 | Knighton et al. | |
| 7,439,975 B2* | 10/2008 | Hsu | G06T 15/60 345/426 |
| 7,688,317 B2 | 3/2010 | Berger | |
| 7,747,965 B2* | 6/2010 | Holecek | G06F 3/0481 715/766 |
| 7,817,163 B2 | 10/2010 | Hanggie et al. | |
| 8,136,047 B2* | 3/2012 | Holecek | G06F 3/048 715/733 |
| 8,341,541 B2* | 12/2012 | Holecek | G06F 17/30994 715/757 |
| 8,345,046 B2 | 1/2013 | Norrby | |
| 8,502,817 B2 | 8/2013 | Deb et al. | |

(Continued)

FOREIGN PATENT DOCUMENTS

| | | |
|---|---|---|
| WO | WO 2009/155688 | 12/2009 |
| WO | WO 2015/048529 | 4/2015 |

OTHER PUBLICATIONS

Hartley, Richard et al., "Multiple View Geometry in Computer Vision", vol. 2, Cambridge, 2000.

(Continued)

*Primary Examiner* — Phu K Nguyen
(74) *Attorney, Agent, or Firm* — Polsinelli LLP

(57) ABSTRACT

A computing device can present a plurality of displayable elements, some of which appear to be on top of or overlaying others. The computing device can determine which displayable elements should cast virtual shadows on which other displayable elements based, at least in part, on a respective virtual depth value associated with each of the displayable elements. In general, a displayable element with a higher depth value can cast a shadow on a displayable element with a lower depth value. The device can select a first displayable element for which a virtual shadow is to be generated. The device can acquire a graphical representation of the first displayable element. The computing device can then apply a blurring technique, a color filtering process, and a transparency filtering process to the graphical representation to generate a virtual shadow for the first displayable element. Then the device can draw or display the shadow.

20 Claims, 11 Drawing Sheets

(56) References Cited

U.S. PATENT DOCUMENTS

| | | | |
|---|---|---|---|
| 8,570,320 B2 | 10/2013 | Izadi et al. | |
| 9,142,193 B2* | 9/2015 | Laubach | G09G 5/14 |
| 9,224,237 B2* | 12/2015 | Costello | G06T 15/20 |
| 9,235,318 B2* | 1/2016 | Matas | G06T 11/60 |
| 9,239,662 B2* | 1/2016 | Matas | G06T 11/60 |
| 2005/0232587 A1 | 10/2005 | Strawn et al. | |
| 2008/0246759 A1 | 10/2008 | Summers | |
| 2010/0079371 A1 | 4/2010 | Kawakami et al. | |
| 2012/0038645 A1 | 2/2012 | Norrby | |
| 2013/0194269 A1 | 8/2013 | Matas et al. | |
| 2014/0325455 A1 | 10/2014 | Tobin | |
| 2015/0091903 A1 | 4/2015 | Costello et al. | |
| 2015/0170396 A1 | 6/2015 | Kornmann | |

OTHER PUBLICATIONS

Tsai, Roger Y., "A Versatile Camera Calibration Technique for High-Accuracy 3D Machine Vision Metrology Using Off-the-Shelf TV Cameras and Lenses", "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, Tsai, Roger Y., 1987, 22 pages.

Zhengyou, Zhang, "A Flexible New Technique for Camera Calibration", "A Flexible New Technique for Camera Calibration," IEEE Transactions on Pattern Analysis and Machine Intelligence, Zhengyou Zhang, 22(11): 1330-1334, 2000, 2000, 22 pages.

International Search Report and Written Opinion for International Patent Application PCT/US2014/057836, mailed Dec. 29, 2014, 12 pages.

* cited by examiner

GENERATING VIRTUAL SHADOWS FOR DISPLAYABLE ELEMENTS

BACKGROUND

Computing devices are becoming more commonplace and are used for a wide variety of purposes. Every day, people use their computing devices to view, access, and/or interact with various types of content and information, especially as computing devices and applications are growing in number and in function. As an example, an increasing number of applications are attempting to meet these expectations by providing a virtual reality, enhanced reality, or three-dimensional experience. While some devices utilize three-dimensional displays that require specific hardware, such as special viewing glasses, these can be expensive and complex, and can provide varying levels of user satisfaction. A large number of devices still utilize conventional two-dimensional displays or provide content that is substantially created in two dimensions. While certain shading or rendering can be utilized to give the impression of three-dimensional content, the content will typically not act like a true three-dimensional object or scene, as changes in position, orientation, or lighting will generally not be updated realistically in the display. Further, in some cases, it can be difficult for the user to visually distinguish one item from another. Further still, under conventional approaches, displaying one object to appear to be on top of another object can appear visually unconvincing or uninteresting. Thus, the virtual nature of the displayed content can be significantly degraded.

BRIEF DESCRIPTION OF THE DRAWINGS

Various embodiments in accordance with the present disclosure will be described with reference to the drawings, in which.

DETAILED DESCRIPTION

Figure 1:
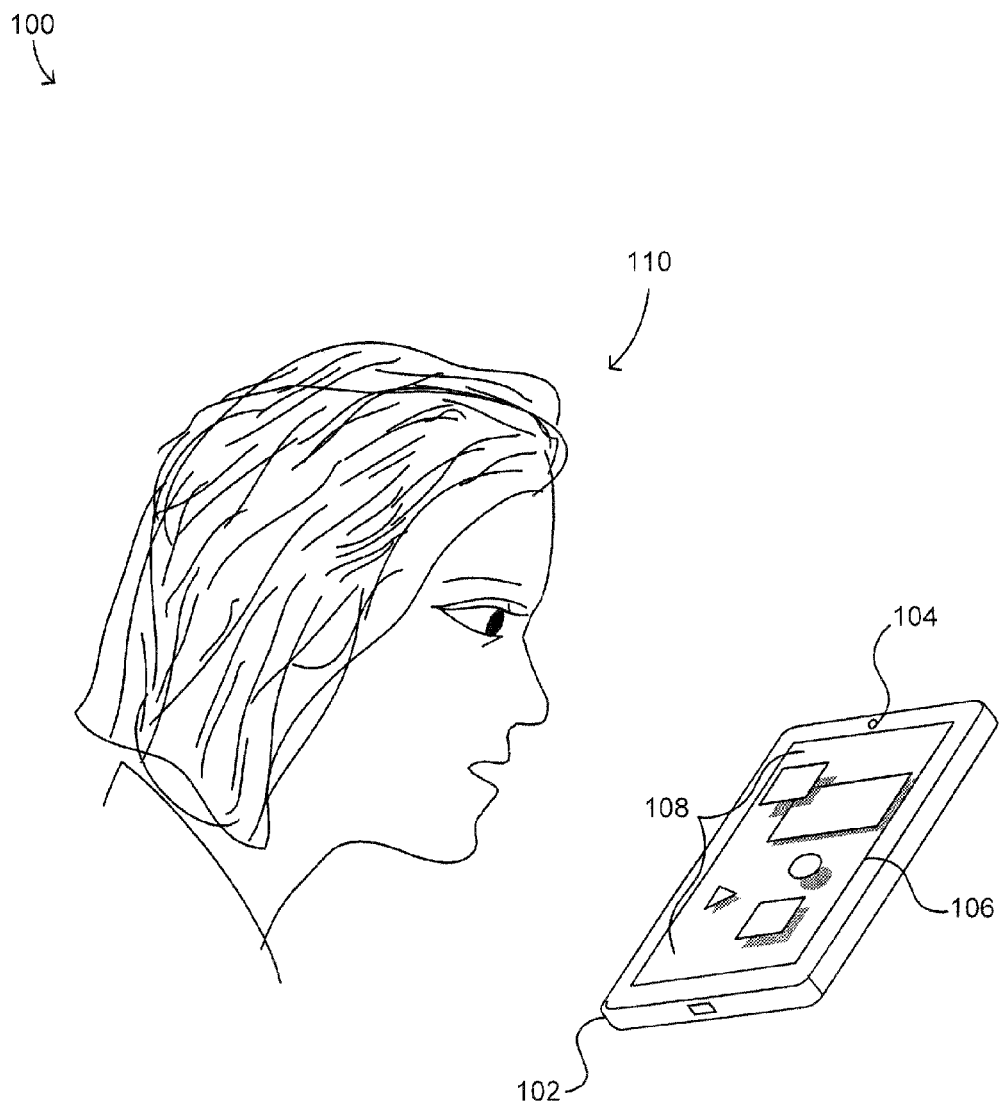
FIG. 1 illustrates an example environment in which aspects of the various embodiments can be utilized.

Systems and methods in accordance with various embodiments of the present disclosure overcome one or more of the above-referenced and other deficiencies in conventional approaches to displaying content using a computing device. In particular, various embodiments of the present disclosure can select a displayable element, generate a virtual shadow for the displayable element, and draw the virtual shadow for the displayable element.

Often times, various processes, computing tasks, and/or other functions performed by a computing device require information and other content to be displayed on a display screen of the device. For example, displayable elements such as user interfaces, images, videos, text, any combination thereof, and/or any portion thereof, etc., can be presented on the display screen of the device. In some cases, the computing device can present displayable elements in a layered fashion, in which one or more displayable elements overlay one or more other displayable elements. In one example, a home screen of the device can display a background element (e.g., wallpaper) and further display icon elements to appear on top of the background element. In another example, a user interface element can display an overlaying window element.

At least some embodiments enable the computing device to implement a virtual depth system, which can be configured to assign or set virtual depths for the displayable elements. For instance, displayable elements of the computing device can each be assigned a respective virtual depth value. A displayable element assigned a higher virtual depth value can be displayed to appear in a higher layer than a displayable element assigned a lower virtual depth value. In some cases, the higher displayable element can visually obscure or block at least a portion of the lower displayable element. In the example of the home screen, the background element can be assigned with the lowest depth value because the background element is presumably associated with the lowest virtual depth plane (i.e., is the lowest in virtual depth and/or appears to be the farthest away from the display glass of the device). In this example, an icon element would have a higher virtual depth (i.e., would be in a higher virtual depth plane) than the background element. Moreover, if the user interacts with one of the icon elements and opens an application element, the application element would likely appear to be on top of both the icon elements and the background element. As such, in this example, the application element would have the highest virtual depth value.

Various embodiments in accordance with the present disclosure can utilize the virtual depth system and generate virtual shadows for displayable elements. A computing device (e.g., an operating system of the device, an application on the device, etc.) can present a plurality of displayable elements, some of which appear to be on top of or overlaying others. The computing device can determine which displayable elements should cast (virtual) shadows on which other displayable elements based, at least in part, on the (virtual) depths of the displayable elements. In general, a displayable element with a higher depth can cast a shadow (i.e., virtual shadow) on a displayable element with a lower depth.

In some embodiments, a computing device can select or identify a first displayable element for which a virtual shadow is to be generated. A displayable element for which a shadow (i.e., virtual shadow) is to be generated can be referred to as a shadow casting element. For example, the device can start with the displayable element that is highest in depth (i.e., virtual depth) and select that highest displayable element as a shadow casting element. The device can acquire a graphical representation of the shadow casting element, such as a copy of the shadow casting element. Often times, acquiring the graphical representation of the shadow casting element does not require significant processing power. The computing device can utilize the device's (e.g., the operating system's, an application's, etc.) drawing system/engine, graphics system/engine, and/or rendering system/engine, etc., to acquire the graphical representation of the selected shadow casting element. In other words, the device is already planning to draw or display the selected displayable element, and so the device can obtain information about the drawing or displaying of the selected displayable element without incurring significant additional processing costs. For example, the device can communicate with its operating system's draw/display buffer to obtain the graphical representation. In some embodiments, the acquired graphical representation can be stored (at least temporarily) in a buffer, cache, and/or other storage element. For instance, the graphical representation can be acquired from a buffer of a graphics system/engine of the computing device.

The computing device can then apply a blurring technique, a color filtering process, and a transparency filtering process to the graphical representation to generate a virtual shadow for the shadow casting element. For example, a Gaussian blurring technique can be applied to the graphical representation to produce a blurred graphical representation. The transparency and color filtering processes can utilize a transparent black filter on the blurred graphical representation to produce a transparent, black-colored version of the blurred graphical representation, which can correspond to the virtual shadow of the shadow casting element.

Moreover, the device can determine where and how to draw or display the shadow, which can include determining, identifying, and/or selecting, etc., a second displayable element on which the shadow is to be drawn or displayed. In other words, the device can identify or select (i.e., determine) a shadow receiving element on which the shadow should fall, which can depend on various factors. For example, determining where and/or how the shadow should be drawn can depend, at least in part, on the location of the shadow casting element relative to the location of the shadow receiving element. Having determined where and how to draw the shadow (if at all), the device can then identify one or more appropriate shadow receiving elements on which to draw or display the shadow of the shadow casting element. The computing device can repeat this process to generate virtual shadows for the other displayable elements.

Other variations, applications, and functions are described and suggested below as may be provided in accordance with the various embodiments.

FIG. 1 illustrates an example environment 100 in which aspects of the various embodiments can be utilized. The example environment 100 can include a computing device 102. The computing device 102 can comprise one or more cameras (e.g., 104), such as one or more front-facing cameras and/or one or more rear-facing camera. In some cases, the one or more cameras can be configured to capture or acquire one or more images including a user 110 of the device 102, such as a head or facial feature of the user 110.

Further, the computing device 102 can comprise a display element (e.g., 106). In some embodiments, the display element can work in conjunction with one or more touch sensors (not shown in FIG. 1). As such, the display element (e.g., 106) can correspond to a touch screen (i.e., touch display), which can be configured to detect one or more touch inputs and/or touch gestures performed by the user 110 of the device 102.

The computing device 102 can perform various functions and accomplish different computing tasks. Often times, the computing device 102 can present information to the user 110 and/or provide one or more ways for the user 110 to input information to the device 102. For example, the computing device 102 can present information via the display 106. The information can include visible information such as text, images, video, and/or other displayable elements, etc. In another example, the computing device 102 can present a user interface via the display 106. The user interface can provide information to the user 110 and/or allow the user 110 to input information to the device 102. Accordingly, using the device display 106, the computing device 102 can present one or more displayable elements (e.g., 108) corresponding to one or more portions of text, images, videos, icons, graphical items, user interfaces, animations, displayable information, etc., as shown in FIG. 1.

In some cases, various displayable elements (e.g., 108) can appear to be layered. In other words, in some cases, one or more displayable elements can appear to be on top of one or more other displayable elements. For example, a home screen of the device 102 can display various icons hovering over a background (e.g., home screen wallpaper). In another example, a user interface represented by a first window can open a second window (e.g., text box, notification, image, video, etc.), such that second window is overlaying the first window. In a further example, a gaming application can provide a character that moves over (or in "front" of) a background or other graphical element.

In some embodiments, the operating system (OS) of the computing device 102 can assign each displayable element a depth value corresponding to a virtual depth plane generated by the operating system. As such, if a first displayable element has a depth value corresponding to a virtual depth plane that is higher than that of a second displayable element, then the first displayable element has a higher (virtual) depth value, and thus is higher in virtual depth, than the second displayable element. Accordingly, if and when the first and second displayable elements overlap in appearance on the device display 106, then the first displayable element will be rendered on top of the second displayable element and, in some cases, at least partially obscure or block the second displayable element. (Further, it is also contemplated that the virtual depth planes, (virtual) depth values, etc., can be generated by and/or implemented in other ways, such as via one or more applications.)

As discussed previously, conventional approaches to displaying items on top of another can be visually unconvincing, uninteresting, or lacking interactivity. For example, in some cases, it can be difficult for the user 110 to recognize that a smaller item is displayed on top of a bigger item, because the smaller item can appear to be at the same depth (i.e., virtual depth) as the bigger item but within the boundaries of the bigger item. In another example, a first item displayed on top of a second item can obscure at least a part of the second item. However, in some instances, the user 110 might mistakenly believe that the two items are at the same depth, and that the entirety of the second item is represented by the unobscured part(s) of the second item. These and other concerns can be addressed by various embodiments of the present disclosure, which can generate (virtual) shadows for displayable elements.

Figure 2A:
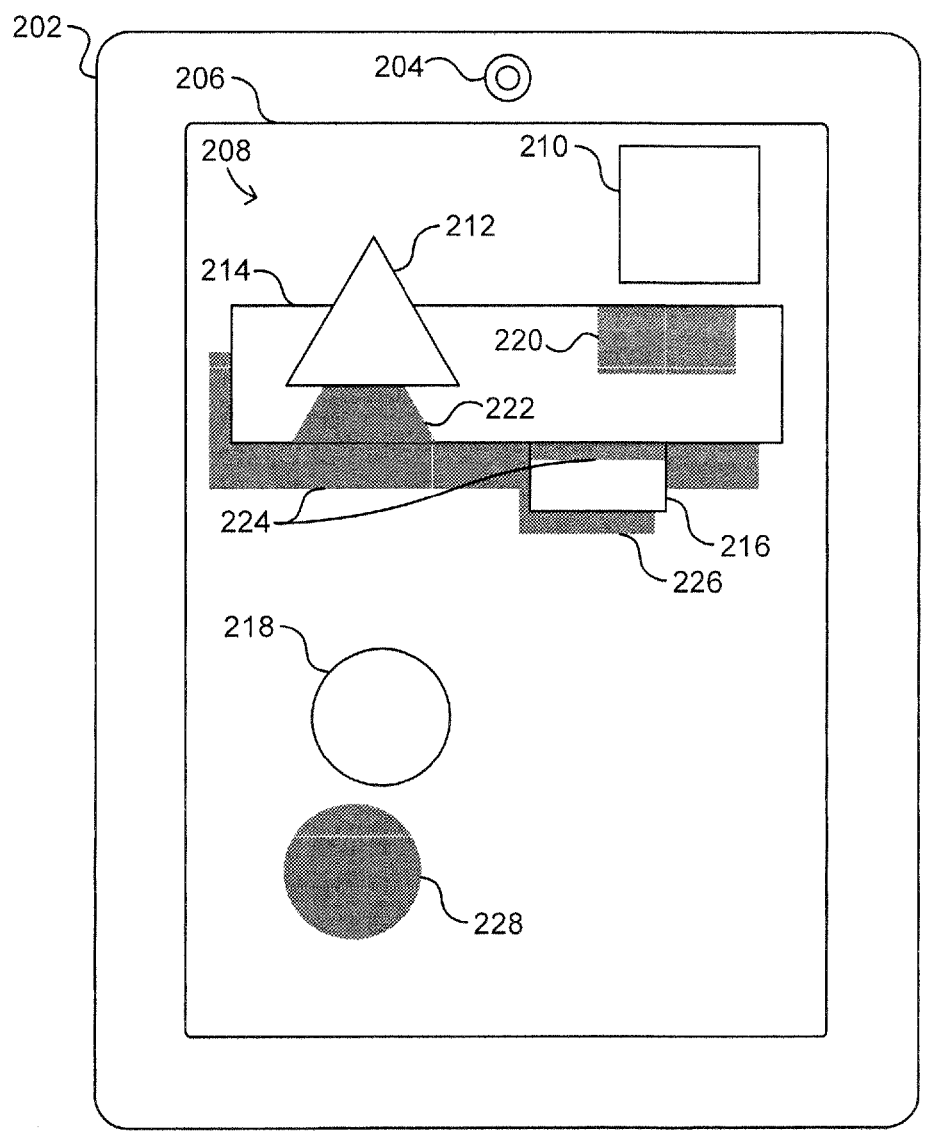
FIG. 2A illustrates an example device embodiment capable of generating virtual shadows for displayable elements.

FIG. 2A illustrates an example device embodiment capable of generating virtual shadows for displayable elements. The example computing device embodiment 202 in FIG. 2A can comprise a camera 204 and a display screen 206. As shown in the example of FIG. 2A, one or more displayable elements (e.g., 208, 210, 212, 214, 216, 218) can be displayed via the display screen 206. The displayable elements (e.g., 208, 210, 212, 214, 216, 218) can correspond to displayed information, user interface components, media portions, messages, backgrounds, wallpapers, etc. The displayable elements can differ in virtual depth, some of which are higher in virtual depth than others (e.g., in a higher virtual depth plane, have a higher virtual depth value, appear "closer to the glass" of the display 206, etc.). Various embodiments of the present disclosure can enable higher displayable elements to cast (virtual) shadows on to other displayable elements that are lower in (virtual) depth. As shown in the example of FIG. 2A, displayable elements 210, 212, 214, 216, and 218 can cast shadows 220, 222, 224, 226, and 228, respectively. (The displayable element 208 can correspond to a background or wallpaper of the device 202.)

In some embodiments, the computing device 202 (e.g., the operating system of the device 202, an application running on the device 202, etc.) can select a displayable element for which to generate a shadow. In other words, the device 202 can select or identify a displayable element as a shadow casting element. In some embodiments, the device 202 can start with the displayable element having the highest depth. The device 202 can generate the shadow for the highest displayable element, display the shadow, and then repeat the process for the rest of the other displayable elements.

When a displayable element is selected, the computing device 202 can acquire a graphical representation of the selected displayable element. In one example, the device 202 can utilize the operating system's (or an application's) drawing system, rendering system, and/or graphics system, etc., to acquire a copy of the selected displayable element. In other words, the operating system (or application) is already planning to draw or display the displayable element, and so the device 202 can obtain information about the drawing or displaying of the displayable element without incurring significant processing costs. In this example, the device 202 can communicate with the operating system's (or application's) draw buffer and/or graphics buffer and obtain a copy of the displayable element to be drawn or displayed. As such, without requiring significant additional processing power, the device 202 can acquire a graphical representation (e.g., a copy) of the displayable element. In some embodiments, the graphical representation can be stored in a buffer, cache, and/or other storage element.

In some embodiments, the device 202 can apply a blurring technique to the graphical representation (e.g., copy) of the displayable element to obtain a blurred graphical representation of the displayable element. In one example, the device 202 can apply a Gaussian blurring technique to the graphical representation. The blurring technique can include downscaling the graphical representation to a reduced sized, blurring the graphical representation in the horizontal direction (e.g., X axis), blurring the graphical representation in the vertical direction (e.g., Y axis), and then up-scaling the reduced size to the initial size (prior to the downscaling). In another example, the device 202 can apply a directional blurring technique which takes into account a pixel's neighbors along a particular direction. A person of ordinary skill in the art would recognize various other techniques or processes which can be utilized to blur the graphical representation.

In some embodiments, the device 202 can apply a color filter and/or a transparency filter to the graphical representation (e.g., copy) of the displayable element. For example, the color filter can include a black color filter configured to give the graphical representation a black color. The transparency filter can provide a transparent effect for the graphical representation, thereby making the graphical representation appear more like a real shadow. It is also contemplated that the applications of the blurring technique, the color filter, and/or the transparency filter can vary in order of performance.

The computing device 202 can select or identify one or more displayable elements as shadow receiving elements. In other words, the device 202 can determine where a shadow will fall (e.g., the device 202 can determine on which displayable element(s) or portions thereof the graphical representation of the shadow casting element will fall). As discussed above, this can depend on the virtual depth of each of the displayable elements. As shown in FIG. 2A, the background/wallpaper 208 can be the shadow receiving element for all other displayable elements (e.g., 210, 212, 214, 216, 218). Further, displayable element 214 can be a shadow receiving element for displayable elements 210 and 212. Also, displayable element 216 can be a shadow receiving element 216.

Additionally, in some embodiments, determining where a shadow falls (e.g., determining where and how to draw/display a shadow) can depend at least in part, on a location of a virtual light source. The virtual light source can represent a point, location, and/or direction from which (virtual) light is cast. In some embodiments, the virtual light source can produce a computer-generated simulation of light (e.g., virtual light) at the location of the virtual light source and/or in a direction based on the virtual light source. In one example, the virtual light can be produced based on using radiosity computational techniques which attempt to track an energy flow of light interacting with materials. Radiosity computational techniques can include illumination algorithms, which can apply a finite element method to solve rendering equations for scenes with surfaces that reflect light diffusely. In another example, the virtual light can be produced based on light physics, which can result in non-photorealistic rendering.

In some cases, there can be a default location of the virtual light source (e.g., set by the operating system and/or application). For example, the virtual light source can have a virtual depth (with respect to a depth axis or Z axis) that is higher than all displayable elements. In other words, the virtual light source can be in the highest virtual depth plane. As such, the virtual light source can cast light in a downward (virtual) depth direction which causes some displayable elements to cast virtual shadows on other displayable element that are lower in (virtual) depth. Further, the planar location of the virtual light source (with respect to horizontal and vertical axes or X and Y axes) can correspond to a location within the planar boundaries of the display screen 206 of the device or a location expanding off or outside of the display screen 206. In some cases, the location can be changed (e.g., by the operating system and/or application). In the example of FIG. 2A (and FIG. 2B), the virtual light source can be located in an upper right portion of the front face of the device 202 and the virtual light source can be the highest in depth.

Moreover, in some embodiments, determining where a shadow falls can depend on the location of the shadow casting element and the location of the shadow receiving element. For example, assuming that a first displayable element is higher in depth (e.g., Z-axis) than a second displayable element, the first displayable element must also be sufficiently close to the second displayable element in the horizontal and vertical directions (e.g., X-axis and Y-axis) in order for the first displayable element's shadow to fall onto the second displayable element. In FIG. 2A, for example, displayable element 210 is too far from displayable element 218 (in the horizontal and vertical directions) and so the shadow 220 of displayable element 210 would not fall onto displayable element 218. In other words, in this case, displayable element 218 is not a shadow receiving element for shadow casting element 210.

Further, it is contemplated that a person of ordinary skill in the art would recognize the mathematics and computational processes and/or approaches that can be utilized to determine where and/or how to cast (e.g., draw, display, etc.) a shadow. For example, the shadow can be drawn/displayed based, at least in part, on information about the relative locations of the virtual light source, the shadow casting element(s), and the shadow receiving element(s).

Figure 2B:
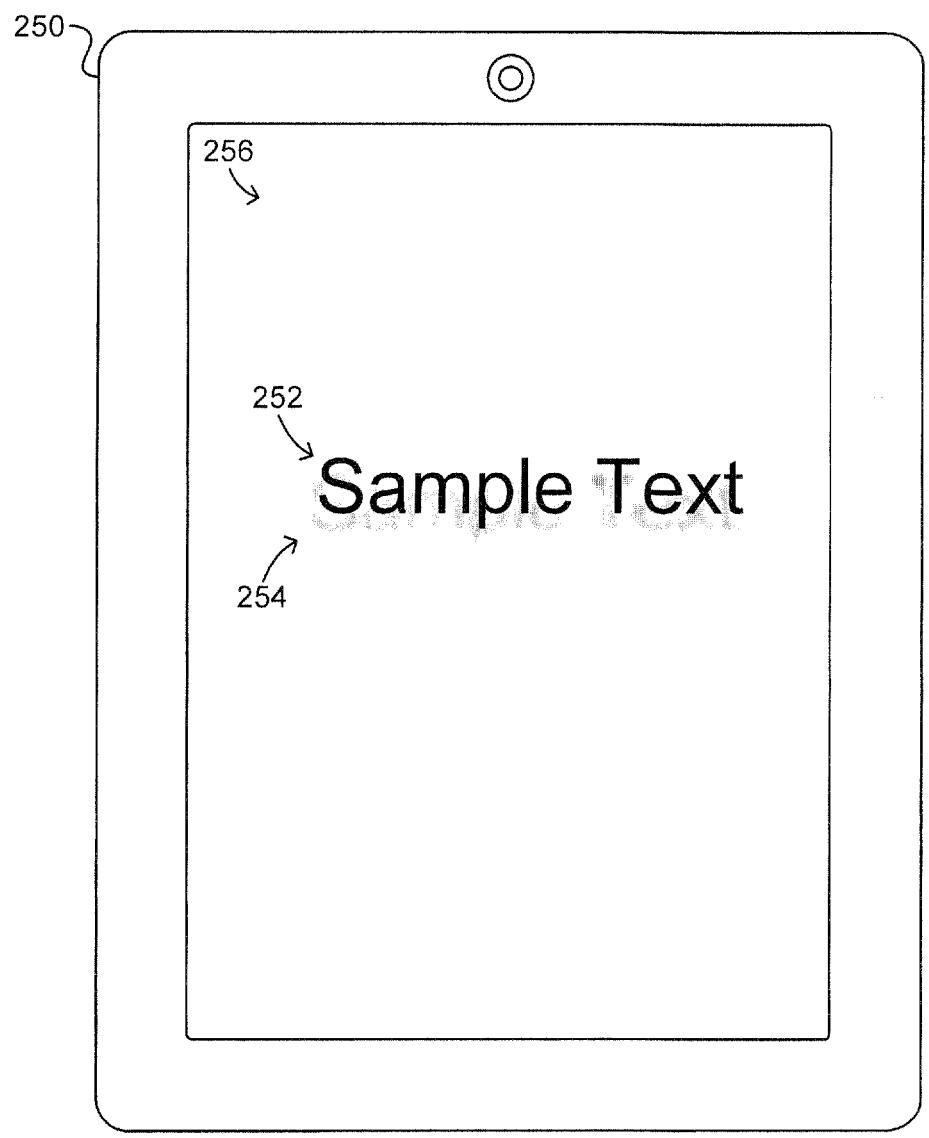
FIG. 2B illustrates an example device embodiment capable of generating virtual shadows for displayable elements.

FIG. 2B illustrates an example device embodiment 250 capable of generating virtual shadows for displayable elements. In some embodiments, a displayable element can correspond to text or a portion(s) thereof. As shown in the example of FIG. 2B, a graphical representation of the displayable element 252 ("Sample Text") can be acquired from the drawing system (e.g., drawing buffer) of the example device 250. A blurring technique, a transparency filter, and a color filter can be applied to the graphical representation to produce a shadow 254 for the displayable element 252 ("Sample Text"). The shadow 254 for displayable element 252 can be drawn onto a shadow receiving element, such as the background 256.

It is important to note that, in at least some embodiments, shadows for displayable elements can be generated and displayed at or near real-time (e.g., within an allowable time period). As discussed previously, acquiring graphical representations (e.g., copies) of displayable elements does not require significant additional processing power because the computing device can utilize the already existing drawing/graphics system. Further, the blurring technique, the color filter, and/or the transparency filter need not be computationally intensive processes. As such, the shadows can be generated at or near real-time.

With regard to the example of FIG. 2B, if the text 252 changes, the device 202 can detect the change in text and regenerate the shadow 254. The device 202 can acquire a graphical representation of the changed text, apply the blurring, transparency, and color effects, and generate a shadow for the changed text. Accordingly, even when displayable elements change, their respective shadows can be (re-)generated and displayed (e.g., at or near real-time) as the displayable elements change.

Figure 3A:
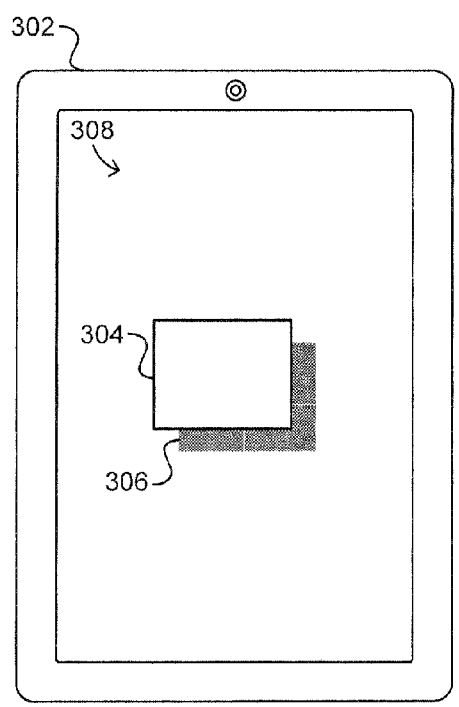
FIG. 3A illustrates an example scenario in which a virtual shadow for a displayable element can be generated.
Figure 3B:
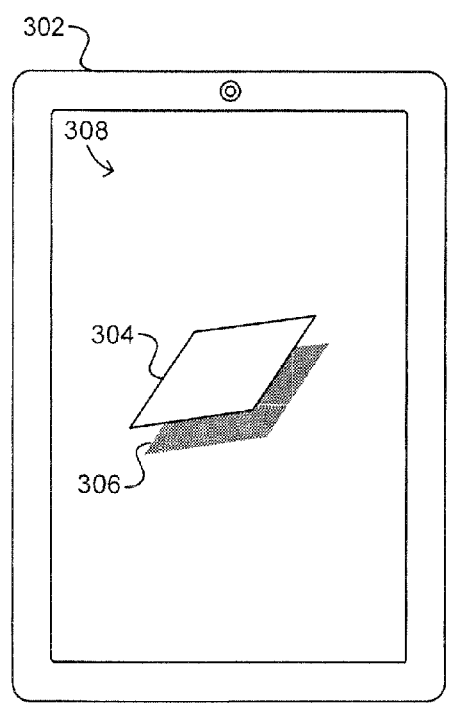
FIG. 3B illustrates the example scenario of FIG. 3A, in which the virtual shadow for the displayable element can be generated.

FIG. 3A and FIG. 3B illustrate an example scenario in which a virtual shadow for a displayable element can be generated. In the example scenario of FIG. 3A (and in FIG. 3B), a virtual light source (not explicitly illustrated in FIG. 3A and FIG. 3B) can be set or configured to be in the upper left corner of the front face of a computing device 302. As such, the virtual light source can cause a displayable element 304 to cast a shadow 306 in a downward right direction, onto the background 308.

In some embodiments, the computing device 302 can detect one or more changes in shape to a displayable element. In the example scenario, the displayable element 304 (shown in FIG. 3A) is rotated and/or translated (shown in FIG. 3B). The device 302 can detect the rotational and/or translational change in shape to the displayable element 304. In response to detecting the change in shape, the initial virtual shadow 306 (in FIG. 3A) of the displayable element 304 can be changed accordingly (shown in FIG. 3B). In other words, the virtual shadow 306 of the displayable element 304 can undergo a substantially same/similar type of change in shape.

Moreover, as discussed previously, in some instances, virtual shadows for displayable elements can be stored in a buffer, cache, or other storage element. In this example scenario, the detected change is with respect to the shape of the displayable element, such that the virtual shadow for the displayable element need not be generated again. Instead, the virtual shadow can be retrieved from the buffer, cache, or other storage element and the same rotational and/or translational change in shape can be applied to the shadow. This can help reduce processing efforts and maintain the possibility of dynamic shadow generation at or near real-time.

Figure 3C:
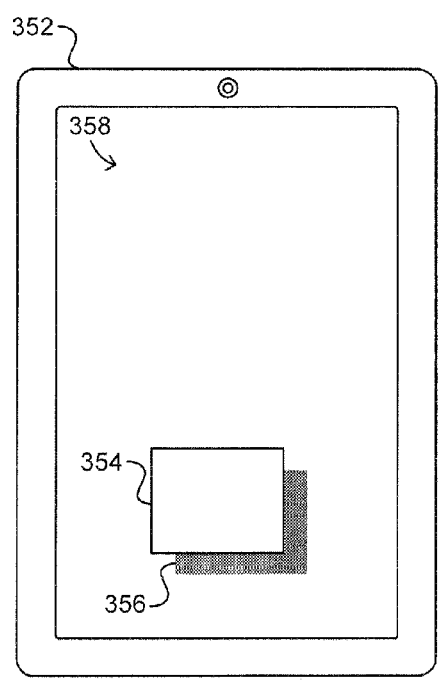
FIG. 3C illustrates an example scenario in which a virtual shadow for a displayable element can be generated.
Figure 3D:
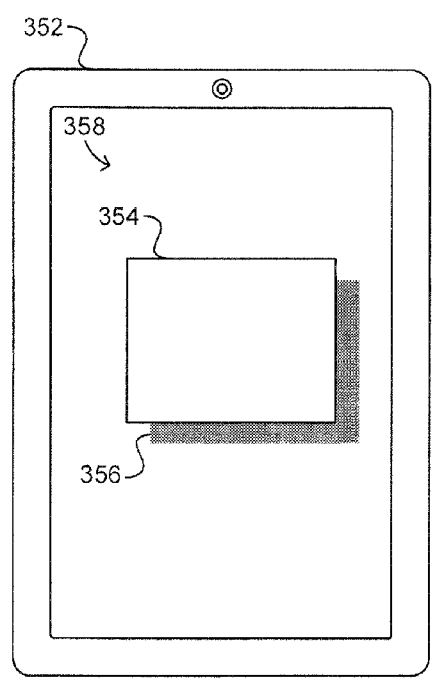
FIG. 3D illustrates the example scenario of FIG. 3C, in which the virtual shadow for the displayable element can be generated.

FIG. 3C and FIG. 3D illustrate an example scenario in which a virtual shadow for a displayable element can be generated. Regarding FIG. 3C and FIG. 3D, a computing device 352 can detect a change in shape to a displayable element 354. As shown in FIG. 3C, the displayable element 354 can be located at a first position on a display screen of the device 354. The displayable element 354 can cast a virtual shadow 356 onto the background 358. However, in this example scenario, the initial displayable element 354 (in FIG. 3C) undergoes a move and a size modification (shown in FIG. 3D). The computing device 352 can detect these changes in shape and can modify the shadow 356 accordingly (shown in FIG. 3D). Again, since these changes in shape do not require a re-generation of the shadow, the shadow can thus be retrieved from storage and undergo a size and location modification, in order to remain compatible with the displayable element 354. As mentioned above, this can also help reduce processing efforts and maintain computing efficiency. It is further contemplated that there can be various other changes to displayable elements which do not necessitate the re-generation of their respective virtual shadows.

Figure 4A:
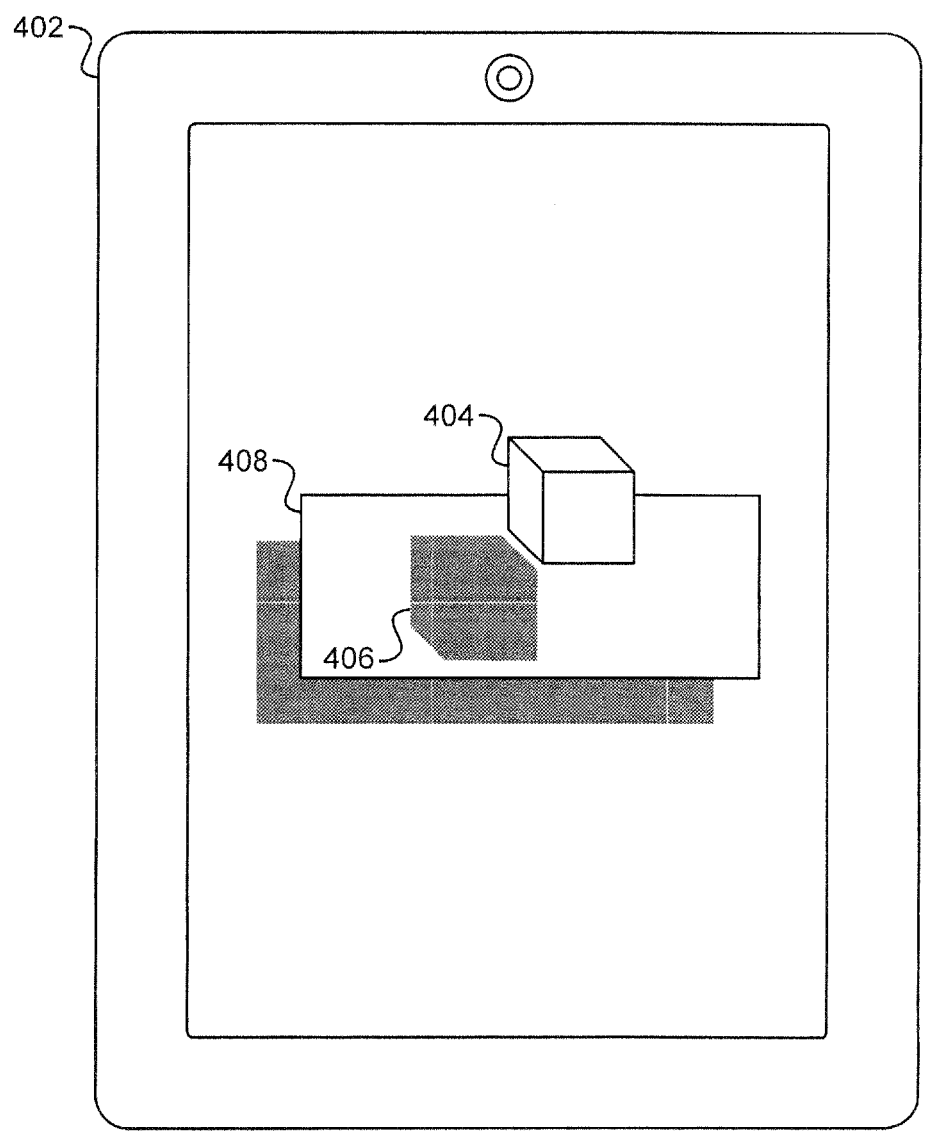
FIG. 4A illustrates an example device embodiment capable of generating virtual shadows for displayable elements.

FIG. 4A illustrates an example device embodiment 402 capable of generating virtual shadows for displayable elements. In the example of FIG. 4A, the virtual light source can be located in an upper right portion of the front face of the computing device embodiment 402. FIG. 4A can illustrate how a three-dimensional displayable element 402 can cast a virtual shadow 406.

In FIG. 4A, the computing device embodiment 402 can present a first displayable element 404 and a second displayable element 408. The first displayable element 404 can be a three-dimensional displayable element. The first displayable element 404, a shadow casting element, can cast a shadow 406 onto the second displayable element 408, the shadow receiving element. In some embodiments, in order to generate the shadow 406 for the three-dimensional element 404, the computing device 402 can acquire a graphical representation of the three-dimensional element 404. In this example, acquiring the graphical representation of the three-dimensional element can involve determining a two-dimensional virtual projection of the three-dimensional element (e.g., a virtual projection of the three-dimensional element onto a flat, two-dimensional surface). The shadow 406 for the three-dimensional element 404 can then be generated based, at least in part, on the two-dimensional virtual projection of the three-dimensional element 404.

Additionally or alternatively, in some embodiments, the device 402 can acquire a graphical representation of a (three-dimensional) shadow casting element, using at least in part a three-dimensional rendering system. The three-dimensional rendering system can determine a projection for the (three-dimensional) shadow casting element from the point of view of the virtual light source. The graphical representation can then be based, at least in part, on the projection. In some cases, the three-dimensional rendering system can be provided by an operating system of the computing device 402.

Figure 4B:
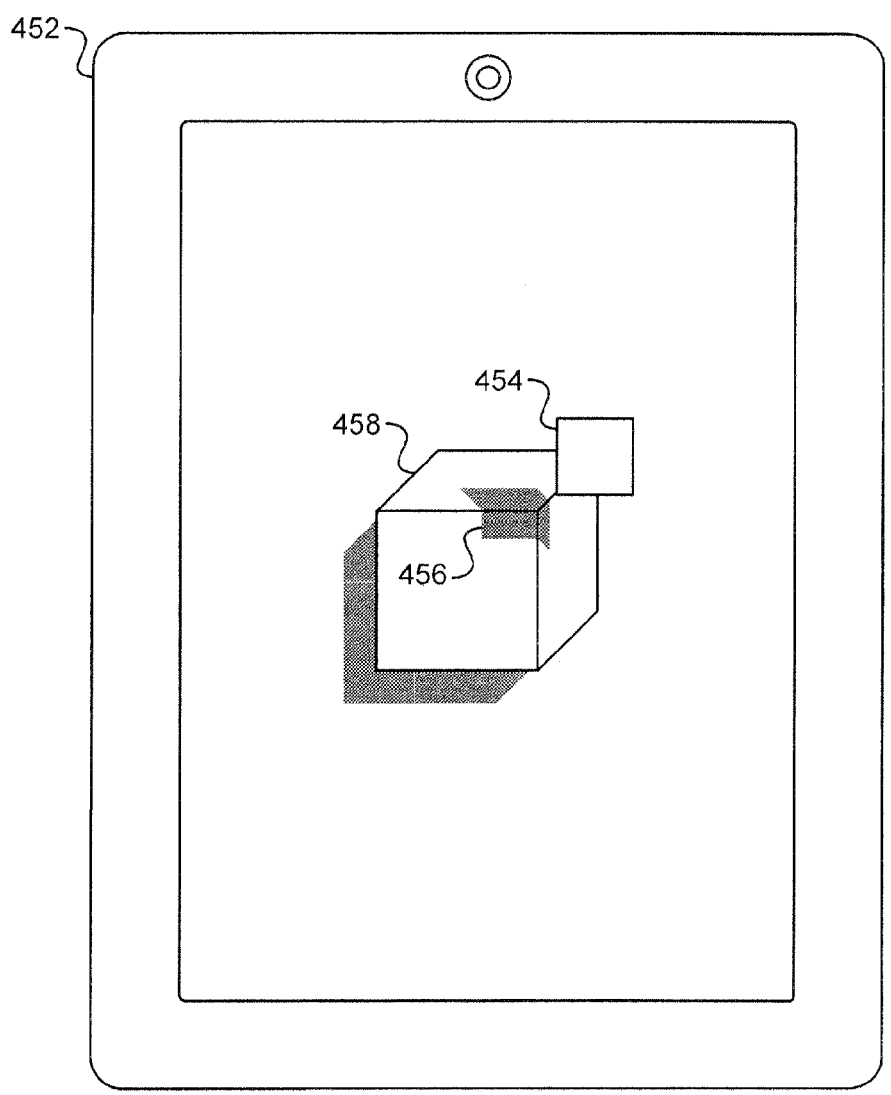
FIG. 4B illustrates an example device embodiment capable of generating virtual shadows for displayable elements.

Turning now to FIG. 4B, an example device embodiment 452 capable of generating virtual shadows for displayable elements is illustrated. In FIG. 4B, the virtual light source is located in a position similar to that in FIG. 4A. FIG. 4B can illustrate an example of how a three-dimensional displayable element 458 can receive a virtual shadow 456 generated by another displayable element 454. In other words, FIG. 4B can show an example of how a shadow 456 can be casted onto a three-dimensional displayable element 458.

As shown in FIG. 4B, a shadow receiving element can include a three-dimensional element 458. In some embodiments, the computing device 452 can determine a location of the shadow casting element 454 (e.g., relative to the X, Y, and Z axes) and a location of the three-dimensional element 458 (e.g., relative to the X, Y, and Z axes). The device 452 can identify one or more surfaces of the three-dimensional element 458 and determine a relative position for each surface with respect to the shadow casting element 454. Then based, at least in part, on the location of the shadow casting element 454, the location of the three-dimensional shadow receiving element 458, and the relative position for each surface with respect to the shadow casting element 454, the computing device 452 can determine at least a portion(s) of the one or more surfaces of the three-dimensional element 458 at which to display the shadow 456 or a portion(s) thereof. As discussed above, it is contemplated that a person of ordinary skill in the art would recognize the mathematics and computational processes and/or approaches that can be utilized to generate, draw, and/or display, etc., the shadow 456 casted onto the three-dimensional shadow receiving element 458.

Additionally or alternatively, in some embodiments, when the shadow receiving element corresponds to a three-dimensional element, the computing device 452 can determine a projection for a graphical representation of the shadow casting element. Further, the device 452 can render, using at least in part a three-dimensional rendering system, the projection for the graphical representation on the second displayable element. Again, in some cases, the three-dimensional rendering system can be provided by an operating system of the computing device 452.

Figure 5:
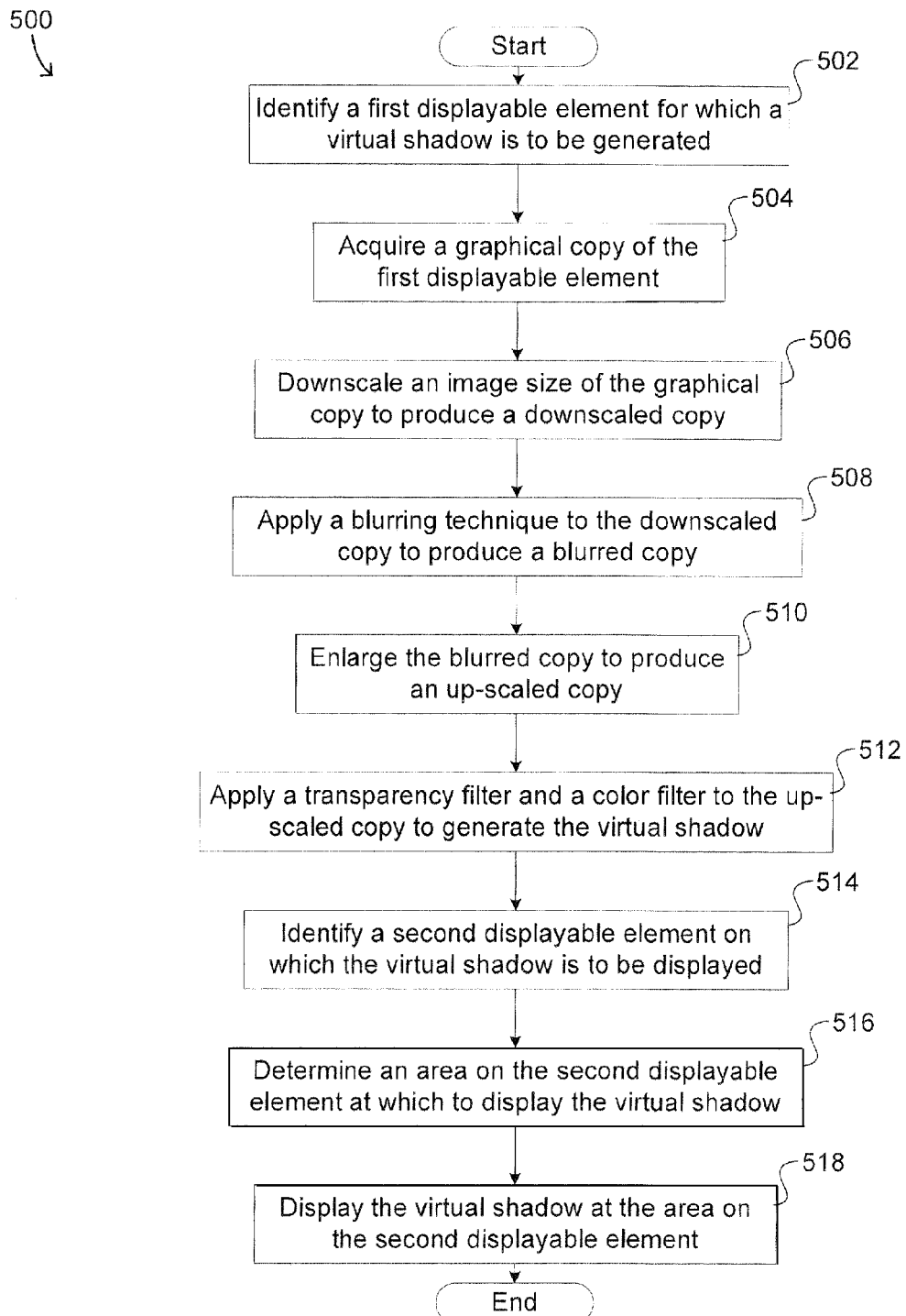
FIG. 5 illustrates an example method embodiment for generating virtual shadows for displayable elements.

FIG. 5 illustrates an example method embodiment for generating virtual shadows for displayable elements. It should be understood that there can be additional, fewer, or alternative steps performed in similar or alternative orders, or in parallel, within the scope of the various embodiments unless otherwise stated. At step 502, the example method embodiment 500 can identify a first displayable element for which a virtual shadow is to be generated. The first displayable element can have a first depth value. At step 504, the method 500 can acquire a graphical copy of the first displayable element. In some cases, the graphical copy can be acquired from an existing drawing system, rendering system, and/or graphics system, etc.

Then at step 506, the method 500 can downscale an image size of the graphical copy to produce a downscaled copy. In some embodiments, downscaling the image size of the graphical copy can include reducing the image size. For example, the image size (e.g., resolution, pixel count, etc.) of the graphical copy can be reduced in half (e.g., in third, in fourth, etc.) and/or by another downscaling process. Step 508 can include applying a blurring technique to the downscaled copy to produce a blurred copy. In some cases, the blurring technique can be applied to the downscaled copy in a first direction and in a second direction. In some instances, the first direction can be orthogonal to the second direction. For example, the first direction can be a horizontal direction (e.g., X-axis) and the second direction can be a vertical direction (e.g., Y-axis).

At step 510, the method 500 can enlarge the blurred copy to produce an up-scaled copy. The up-scaled copy can have the image size prior to downscaling. In some embodiments, enlarging the blurred copy can include increasing the image size of the blurred copy. For example, the image size (e.g., resolution, pixel count, etc.) of the graphical copy can be increased by a factor of two (e.g., three, four, etc.) and/or by another up-scaling process. Step 512 can include applying a transparency filter and a color filter to the up-scaled copy to generate the virtual shadow for first displayable element. Then the method 500 can identify a second displayable element on which the virtual shadow is to be displayed, at step 514. The second displayable element can have a second depth value below the first depth value. Then the method 500 can determine an area on the second displayable element at which to display at least a portion of the virtual shadow, at step 516. Then at step 518, the example method 500 can display the at least the portion of the virtual shadow at the area on the second displayable element.

Figure 6:
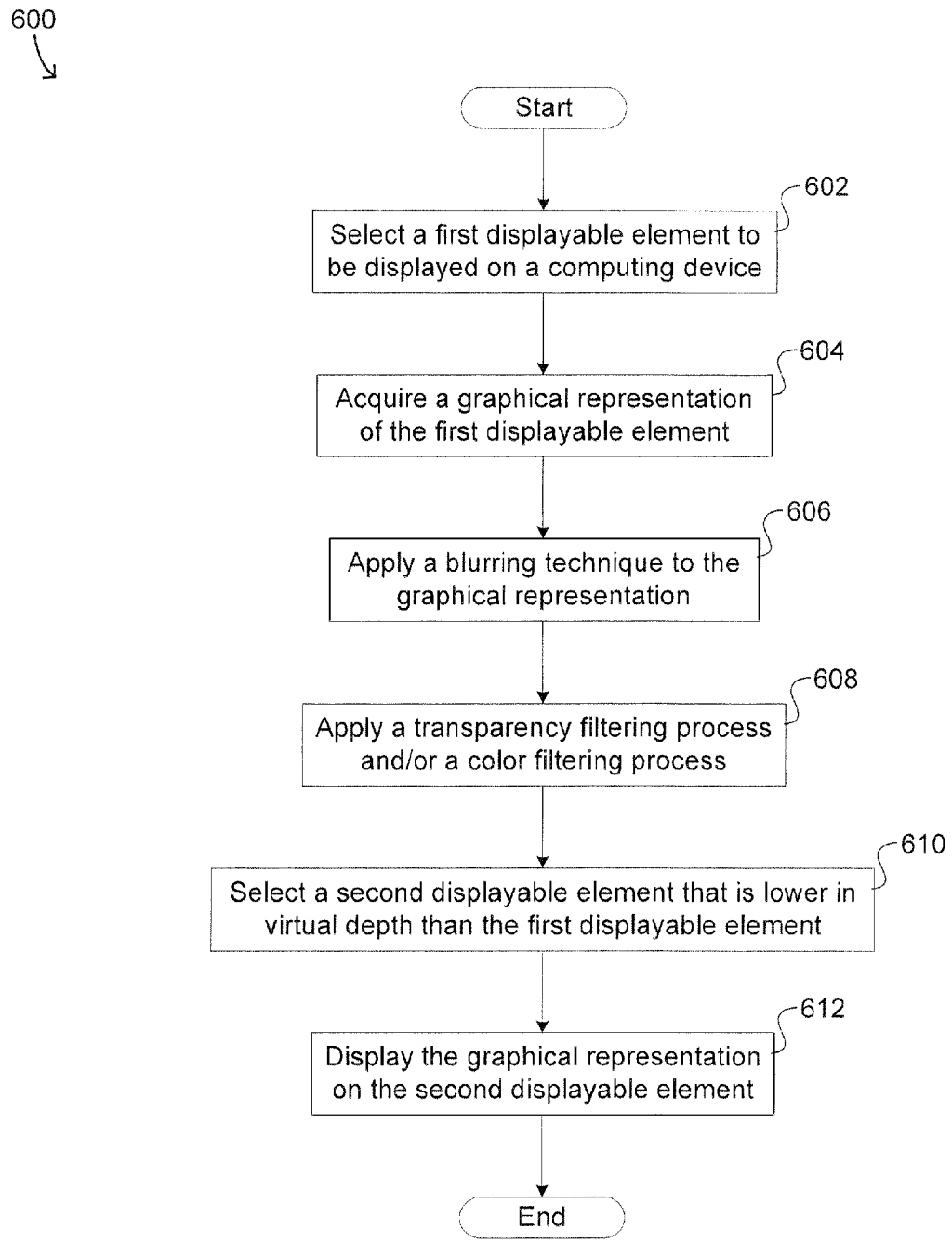
FIG. 6 illustrates an example method embodiment for generating virtual shadows for displayable elements.

FIG. 6 illustrates an example method embodiment for generating virtual shadows for displayable elements. Again, it should be understood that there can be additional, fewer, or alternative steps performed in similar or alternative orders, or in parallel, within the scope of the various embodiments unless otherwise stated. The example method embodiment 600 can select a first displayable element to be displayed on a computing device, at step 602. The method 600 can acquire a graphical representation of the first displayable element, at step 604.

Step 606 can include applying a blurring technique to the graphical representation of the first displayable element. Step 608 can include applying at least one of a transparency filtering process or a color filtering process to the graphical representation. In some cases, the order of performance for the transparency filtering process, the color filtering process, and the blurring technique can be varied. At step 610, the method 600 can select a second displayable element that is lower in virtual depth than the first displayable element. Then the method 600 can display at least a portion of the graphical representation on at least a portion of the second displayable element, at step 612. In some instances, the at least the portion of the graphical representation to be displayed can be identified (using mathematical calculations) based, at least in part, on a position of the first displayable element, a position of the second displayable element, and/or a position of a virtual light source (e.g., relative positions of the first displayable element, the second displayable element, and/or the virtual light source). In some cases, the at least the portion of the second displayable element can be identified (using mathematical calculations)

based, at least in part, on the position of the first displayable element, the position of the second displayable element, and/or the position of the virtual light source.

Moreover, in some embodiments, the computing device can select a third displayable element to be displayed on the computing device, the third displayable element being higher in virtual depth than the second displayable element. The device can acquire a graphical representation of the third displayable element. In some cases, the graphical representation of the third displayable element can overlap with the graphical representation of the first displayable element (i.e., the virtual shadows for the first and third displayable elements can overlap, such as when the virtual shadows are displayed on the second displayable element). This can cause the overlapping area to appear darker, which can be an undesired effect. To address this concern, in some embodiments, the device can acquire the graphical representations of the first and third displayable elements and apply an opaque color (e.g., black color) filter to the two graphical representations, thereby resulting in a combined graphical representation having the same overall color (e.g., black). Then the device can apply the blurring technique and the transparency filtering to the combined graphical representation. Accordingly, in the combined graphical representation, the overlapping area can have the same appearance (e.g., shade, color, brightness, etc.) as the other areas.

Furthermore, in various embodiments of present disclosure, the computing device can select a first displayable element and determine that the first displayable element includes content that is opaque (e.g., the first display element can be entirely opaque). The device can determine that the first displayable element corresponds to a set (or known) shape. The device can acquire a graphical representation of the set shape (e.g., corresponding to the set shape). The device can display at least a portion of the graphical representation of the set shape on at least a portion of a second displayable element that is lower in virtual depth than the first displayable element. The graphical representation of the set shape can correspond to a virtual shadow for the first display element. This can improve processing efficiency associated with providing virtual shadows.

Various embodiments can also utilize the device's orientation. In one example, the device can acquire orientation information using one or more orientation sensors. In some embodiments, the one or more orientation sensors can include at least one of an accelerometer, a gyroscope, an electronic or digital compass, and/or a magnetometer, etc. In some cases, for example, the one or more orientation sensors are operable to detect an orientation and/or change in orientation of the device, which can indicate a direction in which the device is determined to be facing. The device can determine at least a portion of a second displayable element on which to display at least a portion of a shadow. The determination can be based, at least in part, on the orientation information about the computing device. Moreover, in another example, the device can acquire one or more images including a feature of a user of the computing device. The one or more images can be acquired using a camera of the computing device. The device can determine a position of the computing device relative to the feature of the user using, at least in part, the one or more images. The device can determine at least a portion of a second displayable element on which to display at least a portion of a shadow based, at least in part, on the position of the computing device relative to the feature of the user.

It is further contemplated that there can be many other uses and/or applications associated with the various embodiments of the present disclosure that a person having ordinary skill in the art would recognize.

Figure 7:
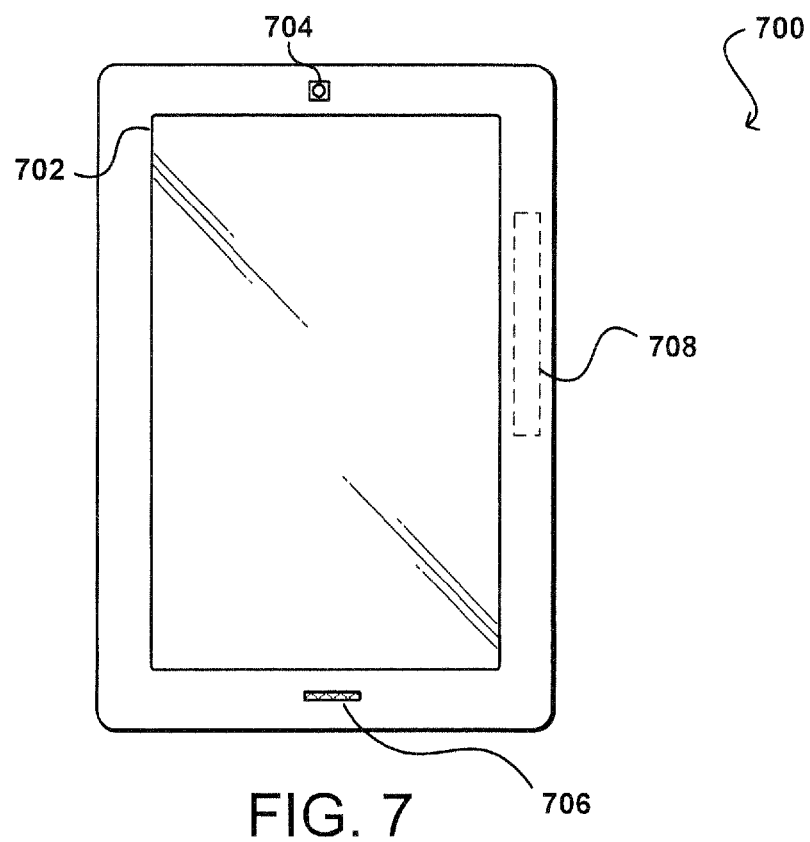
FIG. 7 illustrates an example device that can be used to implement aspects of the various embodiments.

FIG. 7 illustrates an example electronic user device 700 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In some embodiments, a computing device can be an analog device, such as a device that can perform signal processing using operational amplifiers. In this example, the computing device 700 has a display screen 702 on the front side, which under normal operation will display information to a user facing the display screen (e.g., on the same side of the computing device as the display screen). The computing device in this example includes at least one camera 704 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 700 also includes at least one microphone 706 or other audio capture device capable of capturing audio data, such as words or commands spoken by a user of the device. In this example, a microphone 706 is placed on the same side of the device as the display screen 702, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 700 also includes at least one orientation sensor 708, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 8:
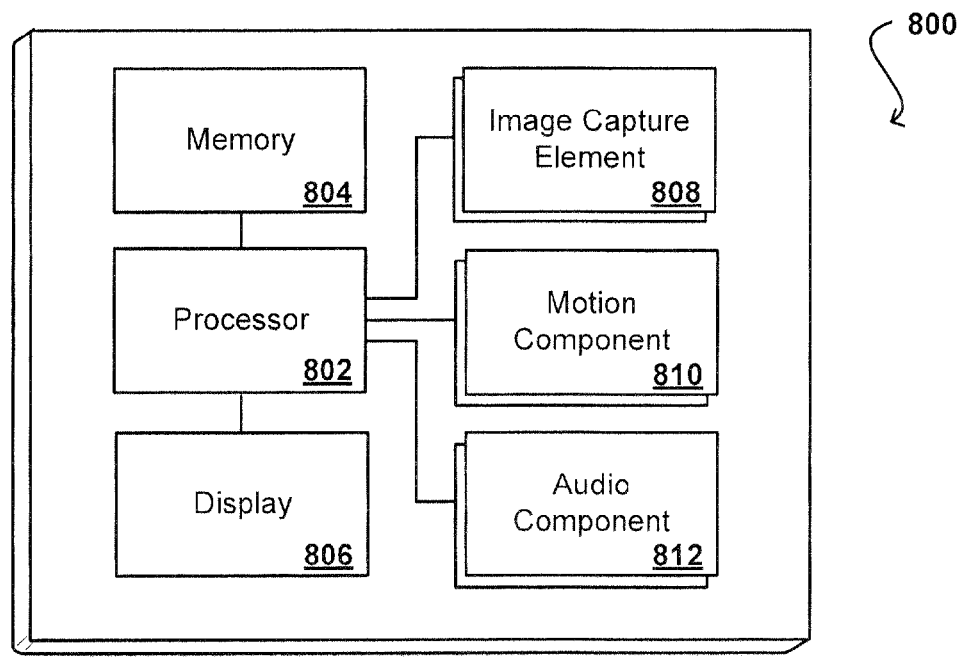
FIG. 8 illustrates example components of a client device such as that illustrated in FIG. 7.

FIG. 8 illustrates a logical arrangement of a set of general components of an example computing device 800 such as the device 700 described with respect to FIG. 7. In this example, the device includes a processor 802 for executing instructions that can be stored in a memory device or element 804. As would be apparent to one of ordinary skill in the art, the device can include many types of memory, data storage, or non-transitory computer-readable storage media, such as a first data storage for program instructions for execution by the processor 802, a separate storage for images or data, a removable memory for sharing information with other devices, etc. The device typically will include some type of display element 806, such as a touch screen or liquid crystal display (LCD), although devices such as portable media players might convey information via other means, such as through audio speakers. As discussed, the device in many embodiments will include at least one image capture element 808 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 812, such as a mono or stereo microphone or microphone array, operable to capture audio information from at least one primary direction. A microphone can be a uni- or omni-directional microphone as known for such devices.

In some embodiments, the computing device 800 of FIG. 8 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 800 also can include at least one orientation or motion sensor 810. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 802, whereby the device can perform any of a number of actions described or suggested herein.

As an example, a computing device such as that described with respect to FIG. 7 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 9:
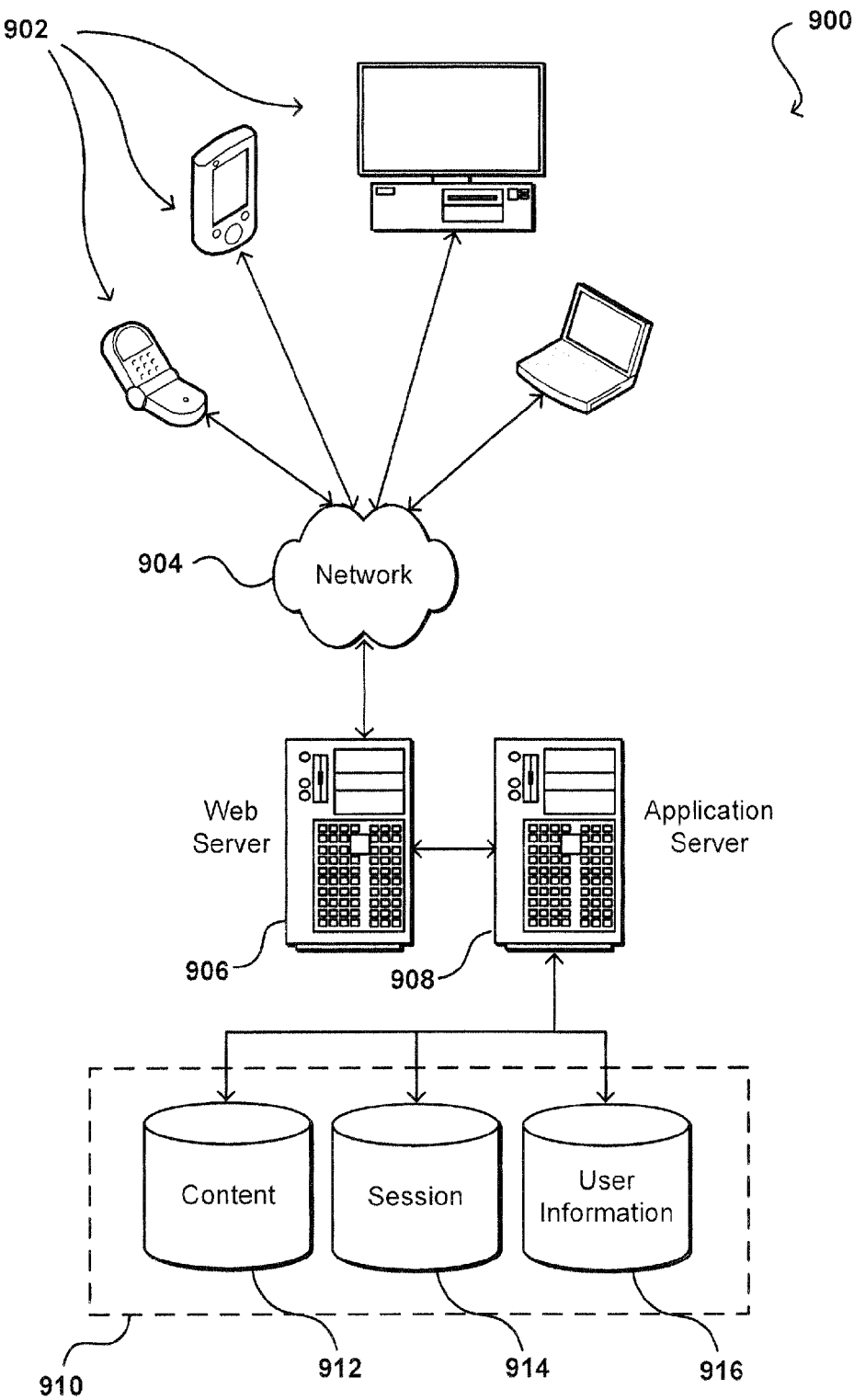
FIG. 9 illustrates an environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 902. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device comprising:
   at least one processor;
   a display screen; and
   a memory device including instructions that, when executed by the at least one processor, cause the computing device to:
   display a first displayable element using a first set of pixels of the display screen during a first period of time;
   render, during at least a portion of the first period of time, a second displayable element that is to be displayed using at least a portion of the first pixels during a second period of time after the first period of time, the second displayable element corresponding to a first virtual depth value set by a virtual depth system of the computing device;
   store the second displayable element to a portion of the memory device;
   acquire a stored copy of the second displayable element from the portion of the memory device;
   reduce an image size of the stored copy to produce a downscaled copy;
   apply a blurring technique to the downscaled copy to produce a blurred copy, the blurring technique being applied to the downscaled copy in a first direction and in a second direction, the first direction being orthogonal to the second direction;
   enlarge the blurred copy to produce an up-scaled copy, the up-scaled copy being enlarged to the image size prior to being reduced;
   apply a transparency filter to the up-scaled copy to produce a transparent copy;
   apply a color filter to the transparent copy to generate a virtual shadow for the second displayable element;
   identify a third displayable element on which the virtual shadow is to be displayed during the second period of time, the third displayable element corresponding to a second virtual depth value below the first virtual depth value;
   determine an area on the third displayable element at which to display at least a portion of the virtual shadow; and
   display at least the portion of the virtual shadow at the area on the third displayable element during the second period of time.

2. The computing device of claim 1, wherein the instructions cause the computing device to further:
   detect an instruction to display the second displayable element in accordance with one or more specified parameters, the one or more specified parameters causing at least one of a rotation, a translation, a resizing, or a movement to the first displayable element; and
   modify the virtual shadow for the second displayable element to correspond to the at least one of the rotation, the translation, the resizing, or the movement, respectively.

3. The computing device of claim 1, wherein the instructions cause the computing device to further:
   determine a first location with respect to the display screen at which the second displayable element is to be displayed, a second location with respect to the display screen at which the third displayable element is to be displayed, and a location of a virtual light source relative to the first location and the second location, wherein the area on the third displayable element at which to display at least the portion of the virtual shadow is based at least in part on relative distances and relative directions among the location of the virtual light source, the first location, and the second location.

4. A computer-implemented method comprising:
   displaying a first displayable element using a first set of pixels of a display screen of a computing device during a first period of time;
   rendering, during at least a portion of the first period of time, a second displayable element that is to be displayed using at least a portion of the first pixels during a second period of time after the first period of time;
   acquiring a stored representation of the second displayable element;
   applying at least one of a blurring technique, a transparency filtering process, or a color filtering process to the stored representation to generate a modified copy of the stored representation;
   determining a third displayable element that is lower in virtual depth than the second displayable element; and displaying at least a portion of the modified copy with respect to at least a portion of the third displayable element during the second period of time.

5. The computer-implemented method of claim 4, further comprising:
identifying at least the portion of the modified copy to be displayed during the second period of time based at least in part on a position of the second displayable element, a position of the third displayable element, and a position of a virtual light source; and
identifying at least the portion of the third displayable element to be displayed during the second period of time based at least in part on the position of the second displayable element, the position of the third displayable element, and the position of the virtual light source.

6. The computer-implemented method of claim 4, further comprising:
determining that the second displayable element has changed in shape; and
causing at least the portion of the modified copy to undergo a substantially same type of change in shape.

7. The computer-implemented method of claim 4, further comprising:
determining a fourth displayable element that is lower in virtual depth than the second displayable element; and
displaying at least a second portion of the modified copy with respect to at least a portion of the third displayable element.

8. The computer-implemented method of claim 4, wherein the stored representation of the second displayable element is acquired from a portion of a memory device of the computing device, and wherein a copy of the second displayable element is stored at least temporarily with the portion of the memory device.

9. The computer-implemented method of claim 4, wherein the blurring process is at least one of a Gaussian blurring process, a directional blurring process, or a down-scaling and up-scaling process.

10. The computer-implemented method of claim 4, wherein the second displayable element is a three-dimensional element, and wherein the method further comprises:
determining, using a graphics system of the computing device, a two-dimensional projection of the three-dimensional element, the two-dimensional projection being determined from a point of view of a virtual light source, wherein a shape of the modified copy is generated to correspond to a shape of the two-dimensional projection.

11. The computer-implemented method of claim 4, wherein the third displayable element is a three-dimensional element, and wherein the method further comprises:
determining a projection for the modified copy of the second displayable element;
rendering, using at least in part a three-dimensional rendering system, the projection for the modified copy on the three-dimensional element; and
displaying the projection for the modified copy with respect to at least one surface portion of the three-dimensional element.

12. The computer-implemented method of claim 4, further comprising:
determining that a fourth displayable element includes content that is opaque;
determining that the fourth displayable element has an outline substantially corresponding to an outline of a shape;
generating a graphical representation corresponding to the shape; and
displaying at least a second portion of the modified copy corresponding to the shape with respect to at least a portion of a fifth displayable element that is lower in virtual depth than the fourth displayable element.

13. The computer-implemented method of claim 4, further comprising:
acquiring orientation information about the computing device using one or more orientation sensors of the computing device;
detecting a change in orientation of the computing device based at least in part on analyzing the orientation information; and
determining at least the portion of the third displayable element on which to display at least the portion of the modified copy based at least in part on the change in orientation of the computing device.

14. The computer-implemented method of claim 4, further comprising:
acquiring one or more images including a feature of a user of the computing device, the one or more images being acquired using a camera of the computing device; and
determining a position of the computing device relative to the feature of the user based at least in part on the one or more images; and
determining at least the portion of the third displayable element on which to display at least the portion of the modified copy based at least in part on the position of the computing device relative to the feature of the user.

15. A non-transitory computer-readable storage medium including instructions that, when executed by at least one processor of a computing system, cause the computing system to:
display a first displayable element to using a first set of pixels of a display screen of the computing system during a first period of time;
render, during at least a portion of the first period of time, a second displayable element that is to be displayed using at least a portion of the first pixels during a second period of time after the first period of time;
acquire a stored representation of the second displayable element;
apply at least one of a blurring process, a transparency filtering process, or a color filtering process to the stored representation to generate a modified copy of the stored representation;
determine a third displayable element that is lower in virtual depth than the second displayable element; and
display at least a portion of the modified copy with respect to at least a portion of the third displayable element during the second period of time.

16. The non-transitory computer-readable storage medium of claim 15, wherein the instructions when executed cause the computing system to further:
determine that the second displayable element has changed in shape; and
cause at least the portion of the modified copy to undergo a substantially same type of change in shape.

17. The non-transitory computer-readable storage medium of claim 15, wherein the stored representation of the second displayable element is acquired from a portion of a memory device of the computing system, and wherein a copy of the second displayable element is stored at least temporarily with the portion of the memory device.

18. The non-transitory computer-readable storage medium of claim 15, wherein the blurring process is at least one of a Gaussian blurring process, a directional blurring process, or a downscaling and up-scaling process.

19. The non-transitory computer-readable storage medium of claim 15, wherein the instructions when executed cause the computing system to further:
   acquire orientation information about the computing system using one or more orientation sensors of the computing system;
   detect a change in orientation of the computing system based at least in part on analyzing the orientation information; and
   determine at least the portion of the second displayable element on which to display the modified copy based at least in part on the change in orientation of the computing system.

20. The non-transitory computer-readable storage medium of claim 15, wherein the instructions when executed cause the computing system to further:
   acquire one or more images including a feature of a user of the computing system, the one or more images being acquired using a camera of the computing system; and
   determine a position of the computing system relative to the feature of the user based at least in part on the one or more images; and
   determine at least the portion of the third displayable element on which to display at least the portion of the modified copy based at least in part on the position of the computing system relative to the feature of the user.

* * * * *